United States Patent [19]

Pace et al.

[11] Patent Number: 4,542,529
[45] Date of Patent: Sep. 17, 1985

[54] PREIONIZING ARRANGEMENT FOR TRANSVERSELY EXCITED LASERS

[75] Inventors: Paul W. Pace, Neufchâtel; Pierre R. Mathieu, Quebec; James M. Cruickshank, Ancienne-Lorette, all of Canada

[73] Assignee: Her Majesty the Queen in right of Canada, Ottawa, Canada

[21] Appl. No.: 443,013

[22] Filed: Nov. 19, 1982

[30] Foreign Application Priority Data

Apr. 13, 1982 [CA] Canada .................................. 400828

[51] Int. Cl.$^4$ .............................................. H01S 3/097
[52] U.S. Cl. .......................................... 372/86; 372/83
[58] Field of Search ........................ 372/86, 87, 83, 55

[56] References Cited

U.S. PATENT DOCUMENTS 4,380,079  4/1983  Cohn et al. ............................ 372/86
4,417,342  11/1983  McKee .................................. 372/86

OTHER PUBLICATIONS

Rickwood, "A Semiconductor Preionizer for Transversely Excited Atmospheric $CO_2$ Lasers"; *J. Appl. Phys.* 53(4), Apr. 1982.

Pace et al., "Miniature Sealed TEA-$CO_2$ Lasers with Integral Semiconductive Preionization", *Rev. Sci. Instrum.*, 53(12), Dec. 1982.

*Primary Examiner*—William L. Sikes
*Assistant Examiner*—Léon Scott, Jr.
*Attorney, Agent, or Firm*—Murray, Whisenhunt & Ferguson

[57] ABSTRACT

The specification describes an improvement in transversely excited lasers having a laser discharge channel in which a pair of opposed, elongated main discharge electrodes are longitudinally disposed in transversely spaced relation, the improvement comprising the provision of means associated with the electrodes defining a first electrical current flow path between the electrodes, providing at least one longitudinally extending discharge gap in the channel and having an electrical impedance which is less than the electrical impedance of lasing material in the chamber prior to excitation thereof whereby upon application of a high energy, high voltage pulse to one of the electrodes, electrical current flows initially through the associated means and produces a longitudinal, substantially uninterrupted, uniform glow discharge along the gap, the discharge reducing the electrical impedance of the lasing material to a value below that of the associated means whereupon the main glow discharge is effected.

12 Claims, 4 Drawing Figures

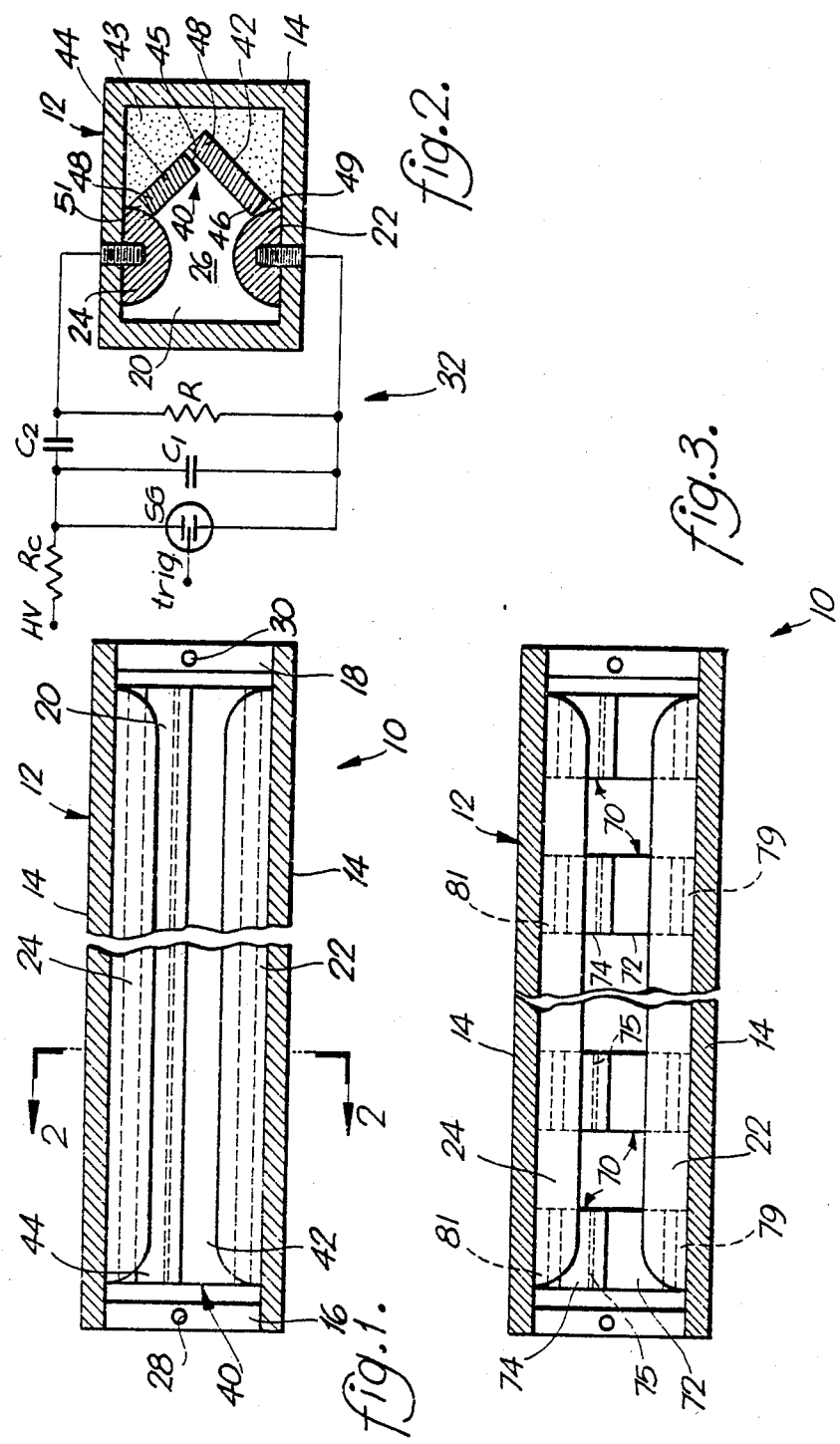

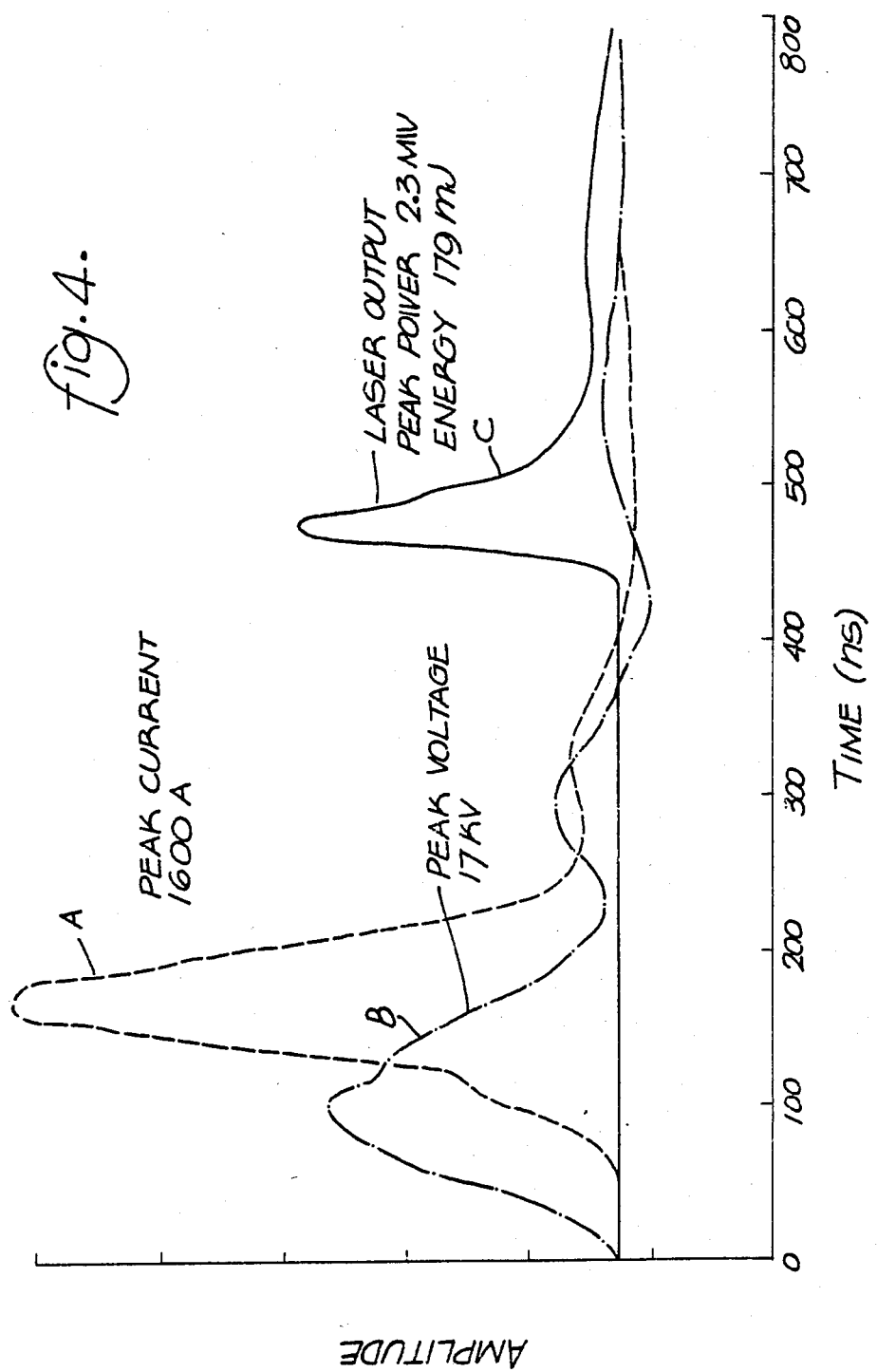

PREIONIZING ARRANGEMENT FOR TRANSVERSELY EXCITED LASERS

This invention generally relates to discharge excited gas lasers and, more specifically, to an arrangement for initiating sustaining laser action in transversely excited (TE) gas lasers.

BACKGROUND OF THE INVENTION

There is considerable potential for the commercial development and military utilization of compact, portable, sealed TE $CO_2$ lasers. The cost, ease of fabrication, reliability and overall system volume are important considerations in the commercial development of discharge excited gas lasers, particularly TE lasers utilizing $CO_2$ as the main lasing material.

Discharge excited gas lasers are typically comprised of a housing which defines a gas tight laser discharge channel through which a lasing material is passed. In TE lasers, a pair of elongated main discharge electrodes are longitudinally disposed within the discharge channel in transversely spaced apart relation. Optical components are disposed at both ends of the channel. Laser action is achieved by exciting the lasing gas material with high energy, high voltage pulses applied across the electrodes by appropriate electrical circuitry.

In order to initiate and sustain proper laser action and avoid dissipation of energy in constrictive arcs between the electrodes, it is necessary to provide some means of producing a uniform glow discharge in the lasing gas mixture. The requirement is particularly acute at gas pressures above a few tens of torr to several atmospheres. Various arrangements have been conceived, certain of which are discussed hereinbelow, for conditioning and preionizing the lasing-gas mixture and these typically play a significant role in the cost, ease of fabrication, reliability and overall system volume of TE lasers.

Several techniques have been developed for initiating and sustaining proper laser action. Among the simplest and most compact devices, ultraviolet (UV) radiation is used to condition the lasing gas mixture before and/or during the discharge. In most of these devices, the UV radiation is produced by a separate discharge, such as by trigger wires, or by separate UV producing arcs. Such arrangements are inherently complex, large and expensive.

A recently developed transversely excited atmospheric (TEA) discharge system relies on a type of corona discharge formation over the surface of a dielectric. The surface discharge produces an efficient ionizing UV radiation which results in the generation of a very homogeneous glow discharge. This system differs from the above mentioned systems in that no additional UV source is present and the excitation rate is very fast. Further, this system operates with a variety of gas mixtures without the need of a dopant and the highly homogeneous character of the discharge results in high power outputs per unit volume and large gains.

Notwithstanding the foregoing, the highly stressed dielectric may lead to problems, particularly at high repetition rates. Further, it is difficult to arrange for high speed transverse gas flow, which is essential for high repetition rate operation, when employing this type of preionization. A very rapid discharge circuit (pulse risetimes in the order of 20-50 ns) places still further restrictions on the construction of a laser of this type. For example, difficulties may arise if the laser discharge module has to be located remotely from the power supply and energy storage capacitors. This configuration tends to increase the inductance of the discharge circuit and thus may prevent operation of the laser. Still further, thyratron switching may not be possible due to the increased circuit inductance.

SUMMARY OF THE INVENTION

The present invention proposes the elimination of the dielectric material and the generation of the required ionizing UV radiation by means of a surface filamentary discharge on a semiconductive plate arrangement placed in close proximity to the main discharge electrodes. The resulting laser is highly durable, compact and provides a viable means for reducing the size, cost and complexity of TE laser discharge systems. In addition, high repetition rate operation utilizing thyratron switching techniques is possible without rapid pulse discharge circuitry.

Generally, the present invention relates to an improvement in transversely excited gas lasers having a laser discharge channel and a pair of opposed main discharge electrodes longitudinally disposed in transversely spaced apart relation within the channel. The improvement comprises the provision of a preionizing arrangement in the channel for producing at least one longitudinally extending, filamentary discharge upon passage of an electrical current through the preionizing arrangement. The arrangement is arranged to have an electrical impedance which is less than the electrical impedance of the lasing material to be passed through the channel prior to excitation of the material. Upon application of a high energy, high voltage pulse to the electrodes and the preionizing arrangement, electrical current flows initially through the preionizing arrangement and produces a longitudinal, filamentary discharge in the channel. The filamentary discharge conditions the lasing material such that the electrical impedance of the lasing material is uniformly reduced along the length of the channel to a level below that of the preionizing arrangement whereat current then flows between the electrodes via the lasing material.

These and other features of the invention will become more apparent from the following description in which reference is made to the appended drawings wherein:

BRIEF DESCRIPTION OF THE DRAWINGS

FIG. 1 is a diagrammatical, longitudinal cross-sectional view of the TE laser of the present invention;

FIG. 2 is a diagrammatical, transverse cross-sectional view taken along lines 2—2 of FIG. 1;

FIG. 3 is a view similar to FIG. 1 but illustrating an alternative semiconductive plate arrangement; and FIG. 4 is a graph illustrating the current, voltage and laser output as a function of time of a laser constructed in accordance with the present invention.

DESCRIPTION OF A PREFERRED EMBODIMENT

With reference to FIGS. 1 and 2 of the drawings, laser 10 includes a housing or enclosure 12 formed of electrically insulating material, such as a ceramic, and constructed in accordance with conventional practice. The housing has a generally rectangular transverse and longitudinal cross-sectional configuration defined by side walls 14 and end walls 16 and 18 defining an elongated laser discharge channel 20 having a discharge volume in the order of about 0.7×0.6×13 cm³. Appropriate optical components (not shown) are mounted at each end of the housing. For example, a gold-coated total reflector with a radius-of-curvature of 5 m may be mounted at one end of the housing and a flat zinc selenide output coupler with an 80% reflectivity at 10.6 μm is mounted at the other end of the housing. The mirrors may be supported in orthogonally adjustable mounts. The structure associated with the end walls 16 and 18 does not form part of the present invention and, accordingly, it has not been illustrated or described in further detail.

A pair of elongated opposed main discharge electrodes 20 and 22 are longitudinally disposed in laser discharge channel 20. As particularly illustrated in FIG. 2, electrodes 22 and 24 are transversely spaced apart so as to define a transverse, interelectrode gap 26 extending substantially along the entire length of channel 20. The electrodes are of the conventional uniform field, profile type well known to those skilled in this field and, accordingly, are not described in detail herein. However, aluminum electrodes profiled according to Chang, T. Y., Rev. Sci. Instrum. 44, 405 (1973) with K=0.04 and an interelectrode gap of 7 mm would be satisfactory for the purposes of the present invention.

Housing 12 is provided with a lasing gas or gas mixture inlet 28 at or adjacent one end 16 and an outlet 30 at or adjacent the other end 18 for through flow of lasing material in a manner well known in the field.

A suitable electrical discharge circuitry 32, diagrammatically illustrated in FIG. 2, is connected to electrodes 22 and 24 for exciting the lasing material in laser channel 20. As will become clearer hereinbelow, circuit 32 can be of relatively simple construction inasmuch as the laser of the present invention requires no rapid discharge or secondary discharge circuitry for activation of the preionizing means.

In accordance with the present invention, the preionizing means is in the form of a semiconductive plate arrangement 40 longitudinally disposed within laser discharge channel 20. Plate means 40 defines at least one longitudinally extending discharge gap which produces a longitudinally extending filamentary discharge upon passage of an appropriate electrical current transversely of the plate means 40.

As used herein with reference to plate means 40 and with reference to plate means 40 in association with electrodes 22 and 24, the term "gap" includes both slight transverse spacing between the plate means and associated electrodes as well as light abutting engagement therebetween.

As shown in FIGS. 1 and 2, plate means 40 is comprised of a pair of elongated semiconductive plates 42 and 44 which are substantially coextensive with the main discharge electrodes and in juxtaposition therewith and with one another. Each plate is generally rectangular in transverse and longitudinal cross-section having spaced longitudinal edges 46 and 48.

As best shown in FIG. 2 of the drawings, the two plates are supported in a V-shaped configuration by a non-conductive ceramic 43, the configuration of which is not critical for proper operation of the subject laser. Edge 46 of plate 44 defines a longitudinally extending uniform gap 45 with side surface 47 of plate 42. Edge 46 of plate 42 defines a longitudinally extending, uniform gap 49 with the surface of electrode 22 while, similarly, edge 48 of plate 44 defines a longitudinally extending, uniform gap 51 with the surface of electrode 24.

The preionizing plate means is arranged to have an electrical impedance which is less than that of the lasing material within discharge channel 20 prior to excitation of the lasing material so that, upon application of a high energy, high voltage pulse between the electrodes, electrical current will flow initially through the preionizing means and produce a longitudinally extending filamentary discharge at each of the aforementioned gaps before the main discharge between the electrodes takes place. The longitudinal filamentary discharges at the gaps uniformly conditions the lasing material within channel 20 by reducing its electrical impedance. As discussed below, the plate-electrode and interplate gaps, the distance between the main discharge electrodes along the surface of the preionization plates and the material of which the plates are made affect the electrical impedance of the preionization plates.

The important consideration insofar as the plate-electrode and interplate gaps are concerned is that they should not be so large as to inhibit proper laser operation. However, subject to this consideration, the interplate may vary depending upon the size of the laser and the width of the plates. It has been found that an interplate gap in the order of 0.2 mm, with an optimum of about 1 mm, provides satisfactory operation. The interplate gap may be filled with a dielectric material such as alumina ceramic. The dielectric material enhances UV radiation production and may increase laser output energy. As indicated above, the plates may be in light abutting contact with one another with no interplate gap.

There need not be a plate-electrode spacing for successful operation of the present invention. Thus, the plates may be in light abutting contact with the electrodes. However, a plate-electrode spacing in the order of 0.5 mm may be provided if so desired.

The distance between the main discharge electrodes via the preionization plates must be such as to prevent surface arc tracking between the main laser discharge electrodes. The elimination of surface tracking is dependent on factors such as the semiconductor material, the interplate gap, interplate material, surface properties of the semiconductor and disposition of the plates. In the arrangement illustrated in FIGS. 1 and 2, with a plate-electrode spacing of 0.1 mm, an interplate spacing of 0.3 mm, no interplate material and silicon carbide as the semi-conductive material, it was found that the distance between the electrodes via the surface of the semiconductor had to be in the order of 1.5–1.8 times the main discharge gap 26 for proper laser action.

The plates may be made of any suitable semiconductive material. Germanium, silicon and silicon carbide have proven satisfactory for the purposes of the present invention. However, germanium and silicon are not as suitable as silicon carbide since they have a tendancy to erode. Silicon carbide is particularly suitable because it is a very hard and durable refractory material which can withstand high temperatures and, moreover, has a non-linear relationship between voltage and current. In particular, the material has high electrical resistance at low voltages and a rapidly decreasing resistance for increasing voltages beyond a breakdown voltage.

In operation, a high energy, high voltage pulse is applied between electrodes 22 and 24 by electrical circuit 32. Because of the high electrical impedance of the lasing material and the preionization plates, there is initially substantially no current flow in the system. When the voltage reaches the breakdown voltage, which is approximately 10-11 kV, the resistance of silicon carbide plates 42 and 44 decreases rapidly and current thus flows between the electrodes via plates 42 and 44, the impedance of the lasing gas mixture still being sufficiently high so as to prevent any substantial current flow therethrough. Flow of current through plates 42 and 44 produces a longitudinally extending, uniform filamentary discharge in the interplate gap 42 and plate-electrode gaps 49 and 51. These discharges, in turn, produce an efficient ionizating UV radiation uniformly along the length of channel 20 which uniformly conditions the main discharge gap by progressively reducing the electrical impedance of the lasing gas mixture therein. About 50-60 ns after the current began to flow through the preionization plates 42 and 44, the main discharge gap has been conditioned to the point where a uniform glow discharge is obtained in the interelectrode gap 26. The resulting discharge has less impedance than the preionization circuit and, thus, the remaining energy of the pulse is deposited in the lasing volume.

FIG. 4 is a graph of a current trace A, a voltage trace B and a laser output trace C as a function of time for a laser constructed in accordance with the above description and utilizing a gas mixture comprised of 76% helium, 11% carbon dioxide and 13% nitrogen at atmospheric pressure. As illustrated therein, there are two components to the current trace A. By varying the voltages, it has been determined that the first peak is due to the preionization and that the second and dominant peak is due to the current in the main discharge. A current density of 200 amps/cm$^2$ over the electrode surface was obtained. The strength of the UV source did not appear to be strongly dependent upon the rise time of the voltage. In fact, it was possible to operate the laser remotely from the capacitor energy storage and spark gap switching system with the interconnection accomplished by a 2 m long cable.

It will be understood that various modifications may be made to the above-described laser without departing from the spirit of the present invention. For example, an additional pair of plates 42 and 44 could be disposed in mirror image relation on the opposite side of electrodes 22 and 24. Plates 42 and 44 need not necessarily be rectangular in cross-section although it is considered that that is the most economical and therefore desirable shape. Plate means 40 could be formed with a single plate or with a plurality of plates, the latter thereby defining a plurality of longitudinally extending, parallel, filamentary discharge gaps. Still further, plate means 40 could be transversely excited separately from the electrodes if so desired although it will be understood that separate excitation would obviously involve greater expense and complexity.

FIG. 3 illustrates a second semiconductive plate arrangement 70 which is similar in construction to that of FIGS. 1 and 2 except that a series of longitudinally aligned, longitudinally spaced pairs of semiconductive plates 72 and 74 replace the continuous plates 42 and 44. As with plates 42 and 44, each pair of plates 72 and 74 is arranged to provide an interplate gap 75 and plate-electrode gaps 79 and 81. Plates 72 and 74 may have a length in the order of 1 cm and the pairs of plates may be longitudinally spaced apart in the order of 3-4 cm. The series of pairs of plates together cooperate to produce longitudinal filamentary discharges in the interplate and plate-electrode gaps and a longitudinally uniform conditioning of the lasing gas mixture in channel 20.

The above-described positioning of plates 42 and 44 as well as plates 72 and 74 permits rapid transverse gas flow resulting in the ability to operate the laser at high repetition rates using thyratron switching.

It will also be seen that the above-described preionization arrangement inherently provides a time delay between the initial application of the voltage pulse and the main discharge in the lasing channel thereby permitting conditioning of the lasing gas mixture utilizing the same electrical circuitry which applies the high voltage pulse. As a result, the electrical excitation circuitry may be relatively simple and inexpensive and permits use of thyratron switching. It will be seen further that the semiconductive plate arrangements can be readily fabricated and are thus relatively inexpensive. The plates are also space-efficient thereby providing a compact, portable TE laser.

It is also possible to operate the laser in a sealed configuration utilizing a room temperature catalyst. For such a configuration, the laser may be placed in a "pyrex" glass envelope. The ends and mirrors may be sealed using O-rings and epoxy. The catalyst may be an activated mixture of stannous oxide and platinum.

The embodiments of the invention in which an exclusive property or privilege is claimed are defined as follows:

1. In a transversely excited gas laser having a laser discharge channel and a pair of opposed main discharge electrodes longitudinally disposed in said channel in transversely spaced relation, the improvement comprising:

preionizing electrode means in said channel defining an electrical current flow path between said main discharge electrodes, said preionizing electrode means including at least one pair of elongated electrode plates substantially coextensive with said main electrodes, each said plate being disposed longitudinally in said channel in juxtaposition with one another and said main electrodes and at an angle to one another so as to provide a longitudinal plate-electrode discharge gap between each said plate and one of said main discharge electrodes and a longitudinal interplate discharge gap between said plates;

said electrode plates being formed of a semiconductive material characterized by a relatively high impedance at relatively low voltages and a rapidly decreasing impedance at increasing voltages beyond a breakdown voltage such that upon application of a high energy, high voltage electrical pulse to said main electrodes and said preionizing electrode means, the electrical impedance of said preionizing electrode means drops below the impedance of lasing material in said channel whereby electrical current initially flows through said preionizing electrode plates and produces a longitudinal, filamentary discharge along each said gap, which discharges serve to precondition said lasing material within said channel.

2. A laser as defined in claim 1, said plates being made of silicon carbide.

3. A laser as defined in claim 2, each said plate-electrode gap being in the range of 0-1 mm.

4. A laser as defined in claim 2, said interplate gap being in the range of 0-2 mm.

5. A laser as defined in claim 1, said interplate gap being filled with a dielectric material.

6. A laser as defined in claim 1, wherein the distance between said main discharge electrodes along the surface of said preionizing electrode plates is in the range of 1.5 to 1.8 times the inter-electrode gap.

7. In a transversely excited gas laser having a laser discharge channel and a pair of opposed main discharge electrodes longitudinally disposed in said channel in transversely spaced relation, the improvement comprising:

preionizing electrode means in said channel defining an electrical current flow path between said main discharge electrodes, said preionizing electrode means including a plurality of longitudinally aligned and longitudinally spaced apart pairs of semiconductive plates, each said plate of said pair of plates being in electrical current conducting relation with one of said main electrodes and defining therewith a longitudinally extending plate-electrode discharge gap, said plates of each said pair of plates being disposed at an angle to one another and together defining a longitudinally extending interplate discharge gap;

said electrode plates being formed of a semiconductive material characterized by a relatively high impedance at relatively low voltages and a rapidly decreasing impedance at increasing voltages beyond a breakdown voltage such that upon application of a high energy, high voltage electrical pulse to said main electrodes and said preionizing electrode means, the electrical impedance of said preionizing electrode means drops below the impedance of lasing material in said channel whereby electrical current initially flows through said preionizing electrode plates and produces a longitudinal, filamentary discharge along each said gap, which discharges serve to precondition said lasing material within said channel.

8. A laser as defined in claim: 7, each said plate-electrode gap being in the range of 0–1 mm.

9. A laser as defined in claim 8, each said interplate gap being in the range of 0–2 mm.

10. A laser as defined in claim 7, each said interplate gap being filled with a dielectric material.

11. A laser as defined in claim 7, said semiconductive material being silicon carbide.

12. A laser as defined in claim 7, wherein the distance between said main discharge electrodes along the surface of said preionizing electrode plates is in the range of 1.5 to 1.8 times the inter-electrode gap.

* * * * *